US009225821B2

(12) United States Patent
Sun et al.

(10) Patent No.: US 9,225,821 B2
(45) Date of Patent: Dec. 29, 2015

(54) MAXIMIZING INFORMATION GAIN FOR CONTINUOUS EVENTS

(71) Applicants: Gufei Sun, Shanghai (CN); Heng Wang, Shanghai (CN); Wen-Syan Li, Fremont, CA (US)

(72) Inventors: Gufei Sun, Shanghai (CN); Heng Wang, Shanghai (CN); Wen-Syan Li, Fremont, CA (US)

(73) Assignee: SAP SE, Walldorf (DE)

( * ) Notice: Subject to any disclaimer, the term of this patent is extended or adjusted under 35 U.S.C. 154(b) by 406 days.

(21) Appl. No.: 13/940,921

(22) Filed: Jul. 12, 2013

(65) Prior Publication Data
US 2015/0002304 A1    Jan. 1, 2015

(30) Foreign Application Priority Data
Jun. 26, 2013  (CN) .......................... 2013 1 0260134

(51) Int. Cl.
| | |
|---|---|
| *G08B 5/00* | (2006.01) |
| *H04M 1/725* | (2006.01) |
| *G06F 17/30* | (2006.01) |
| *G06Q 30/00* | (2012.01) |
| *G06Q 30/02* | (2012.01) |

(52) U.S. Cl.
CPC ..... *H04M 1/72552* (2013.01); *G06F 17/30867* (2013.01); *H04M 1/72569* (2013.01); *G06Q 30/00* (2013.01); *G06Q 30/02* (2013.01); *G06Q 30/0267* (2013.01)

(58) Field of Classification Search
CPC ... G06F 17/30867; G06F 17/00; G06Q 30/02; G06Q 10/06
See application file for complete search history.

(56) References Cited

U.S. PATENT DOCUMENTS

| 5,862,381 | A | * | 1/1999 | Advani ................ G01R 13/029 345/684 |
| 5,874,965 | A | * | 2/1999 | Takai ..................... G06F 3/0481 345/667 |
| 7,343,312 | B2 | | 3/2008 | Capek et al. |
| 7,359,496 | B2 | | 4/2008 | Qian et al. |
| 7,444,596 | B1 | | 10/2008 | Cope et al. |
| 7,844,957 | B2 | * | 11/2010 | Doucette ................... G06F 8/30 717/105 |
| 7,855,975 | B2 | | 12/2010 | Neugebauer |
| 8,244,893 | B2 | | 8/2012 | Branigan et al. |

(Continued)

FOREIGN PATENT DOCUMENTS

WO    WO-2011029358 A1    3/2011

OTHER PUBLICATIONS

SAP AG; SAP PLM service & software solution guide; Accessed on Jul. 8, 2014; SAP AG; Walldorf; Germany.

*Primary Examiner* — Hai Phan
*Assistant Examiner* — Son M Tang
(74) *Attorney, Agent, or Firm* — Brake Hughes Bellermann LLP

(57) ABSTRACT

The embodiments provide a system for maximizing information gain for messages. The system may include an information processing unit configured to receive a plurality of messages having a plurality of attributes, and an integrated optimizer configured to receive an information gain model representing information gain of the plurality of messages and output a message schedule for displaying at least a subset of the plurality of messages on a display terminal including calculating a significance and display time for each of the plurality of messages using the information gain model and the plurality of attributes such that the information gain is substantially maximized. The calculated significance may determine which of the plurality of messages are included in the message schedule and the display time may provide a time period for which each message of the subset is displayed.

20 Claims, 6 Drawing Sheets

(56) References Cited

U.S. PATENT DOCUMENTS

| | | |
|---|---|---|
| 8,325,750 B2 | 12/2012 | Eugene et al. |
| 8,370,521 B2 | 2/2013 | Lamba et al. |
| 8,429,228 B1 | 4/2013 | Avrahami et al. |
| 2005/0100151 A1* | 5/2005 | Lemchen ............ G06F 3/0481 379/159 |
| 2005/0108332 A1 | 5/2005 | Vaschillo et al. |
| 2008/0233930 A1 | 9/2008 | Wurster et al. |
| 2008/0282155 A1* | 11/2008 | Kempanna ........ G06F 17/30867 715/273 |
| 2010/0107176 A1 | 4/2010 | Kessler |
| 2011/0184810 A1* | 7/2011 | Dharmaji ............ G06Q 30/0267 705/14.64 |
| 2011/0202408 A1 | 8/2011 | Kalliola |
| 2014/0031965 A1* | 1/2014 | Sun ........................ G06F 17/00 700/100 |
| 2015/0089358 A1* | 3/2015 | Li ........................ G06F 3/0485 715/273 |

* cited by examiner

MAXIMIZING INFORMATION GAIN FOR CONTINUOUS EVENTS

CROSS-REFERENCE TO RELATED APPLICATION

This application claims priority under 35 U.S.C. §119 to Chinese Patent Application No. 201310260134.2, filed on Jun. 26, 2013, entitled "MAXIMIZING INFORMATION GAIN FOR CONTINUOUS EVENTS", which is incorporated herein by reference in its entirety.

BACKGROUND

In today's environment, people are presented with a relatively large amount of information such as information from their various email accounts, news feeds, social media sources, weather reports, pollution reports, calendars, and/or any other type of information source. However, integrating information from different sources and presenting this information to users in an efficient way may be a challenging task.

Conventional methods may process continuous event data based on a first-come-first serve basis or a preemptive priority queue that gives priority to some information over other information. For example, one conventional method may receive messages from a variety of sources, and then process and display the messages on a first-come-first serve basis, where newer messages replace older messages. Another conventional method may process the messages using the preemptive priority queue, where some messages are assigned a higher priority than other messages, and the messages with the higher priority may replace older messages with a lower priority. However, these conventional methods as well as other related methods do not efficiently integrate information for temporal, visual, and/or spatial costs in order to maximize information gain.

SUMMARY

The embodiments provide a system for maximizing information gain for messages. The system may include at least one processor, and a non-transitory computer-readable medium including instructions executable by the at least one processor. The instructions may be configured to implement an information processing unit configured to receive a plurality of messages having a plurality of attributes, and an integrated optimizer configured to receive an information gain model representing information gain of the plurality of messages and to output a message schedule for displaying at least a subset of the plurality of messages on a display terminal including calculating a significance and display time for each of the plurality of messages using the information gain model and the plurality of attributes such that the information gain is substantially maximized. The calculated significance may determine which of the plurality of messages are included in the message schedule and the display time may provide a time period for which each message of the subset is displayed.

The system may include an information gain unit configured to determine the information gain model based on a weighted sum of information carried by each message of the plurality of messages, where the sum of information carried by each message is weighted by the significance of each message of the plurality of messages.

The information gain unit configured to determine the information gain model also includes incorporating an acquisition model into the information gain model such that the information carried by each message is represented by parameters specific to the acquisition model and the display time corresponding to a respective message.

The system may include a distraction unit configured to determine a penalty model to prevent at least an overlap of displayed messages. The penalty model may be based on a weighted sum of sizes of the plurality of messages in comparison with a capacity of the display terminal, where the sum of sizes is weighted by the significance of each message of the plurality of messages. The integrated optimizer may be configured to incorporate the penalty model into the information gain model.

The system may include a display coordinator configured to determine visual options of the displayed messages based on the calculated significance and the display time of each message, where the visual options may include at least one of font, size, and color of the displayed messages.

The display coordinator may be configured to determine a position on the display terminal for each displayed messages based on the corresponding calculated significance. The display coordinator may be configured to determine a speed in which the displayed messages are moving based on the corresponding calculated significance. At least one of the plurality of attributes may include an importance attribute indicating a relative level of importance to a respective source or user.

The system may include an updating unit configured to receive new messages and cause the integrated optimizer to adjust the information gain model to discount the information gain of the displayed messages, where the integrated optimizer is configured to output an updated schedule for the new messages and the displayed messages based on the adjusted information gain model.

The embodiments also include a non-transitory computer-readable medium storing instructions that when executed cause at least one processor to maximize information gain of messages. The instructions may include instructions to receive a plurality of messages having a plurality of attributes from at least one source, receive an information gain model representing information gain of the plurality of messages, and output a message schedule for displaying at least a subset of the plurality of messages on a display terminal including calculating a significance and display time for each of the plurality of messages using the information gain model and the plurality of attributes such that the information gain is substantially maximized. The calculated significance may determine which of the plurality of messages are included in the message schedule and the display time may provide a time period for which each message of the subset is displayed.

The instructions may include instructions to determine the information gain model based on a weighted sum of information carried by each message of the plurality of messages, where the sum of information carried by each message is weighted by the significance of each message of the plurality of messages.

The instructions to determine the information gain model include instructions to incorporate an acquisition model into the information gain model such that the information carried by each message is represented by parameters specific to the acquisition model and the display time corresponding to a respective message.

The instructions may include instructions to determine a penalty model to prevent at least an overlap of displayed messages. The penalty model may be based on a weighted sum of sizes of the plurality of messages in comparison with a capacity of the display terminal, where the sum of sizes is weighted by the significance of each message of the plurality of messages, and the penalty model may be incorporated into the information gain model.

The instructions may include instructions to determine visual options of the displayed messages based on the calculated significance and the display time of each message, where the visual options includes at least one of font, size, and color of the displayed messages.

The instructions to determine visual options include instructions to determine a position on the display terminal for each displayed messages based on the corresponding calculated significance.

The instructions may include instructions to receive new messages and adjust the information gain model to discount the information gain of the previously displayed messages, and output an updated schedule based on the adjusted information gain model.

The embodiments also may include a method for maximizing information gain of messages. The method may include receiving, by at least one processor, a plurality of messages having a plurality of attributes from at least one source, and determining, by the at least one processor, an information gain model representing information gain of the plurality of messages. The information gain model may be based on a weighted sum of information carried by each message of the plurality of messages, where the sum of information carried by each message is weighted by a significance of each message of the plurality of messages. The method may also include incorporating, by the at least one processor, an acquisition model into the information gain model such that the information carried by each message is represented by parameters specific to the acquisition model and a display time corresponding to a respective message, and outputting, by the at least one processor, a message schedule for displaying the plurality of messages including calculating the significance and the display time for each of the plurality of messages such that the information gain is substantially maximized based on the information gain model and the plurality of attributes of the plurality of messages.

The method may further include determining, by the at least one processor, a penalty model to prevent at least an overlap of displayed messages. The penalty model may be based on a weighted sum of sizes of the plurality of messages in comparison with a capacity of the display terminal, where the sum of sizes is weighted by the significance of each message of the plurality of messages. The method may also include incorporating, by the at least one processor, the penalty model into the information gain model.

The method may further include determining, by the at least one processor, visual options of the displayed messages based on the calculated significance and the display time of each message, where the visual options include at least one of font, size, and color of the displayed messages.

The method may further include receiving, by the at least one processor, new messages, adjusting, by the at least one processor, the information gain model to discount the information gain of the displayed messages, and outputting, by the at least one processor, an updated schedule for the new messages and the display messages based on the adjusted information gain model.

The details of one or more implementations are set forth in the accompanying drawings and the description below. Other features will be apparent from the description and drawings, and from the claims.

DETAILED DESCRIPTION

Figure 1:
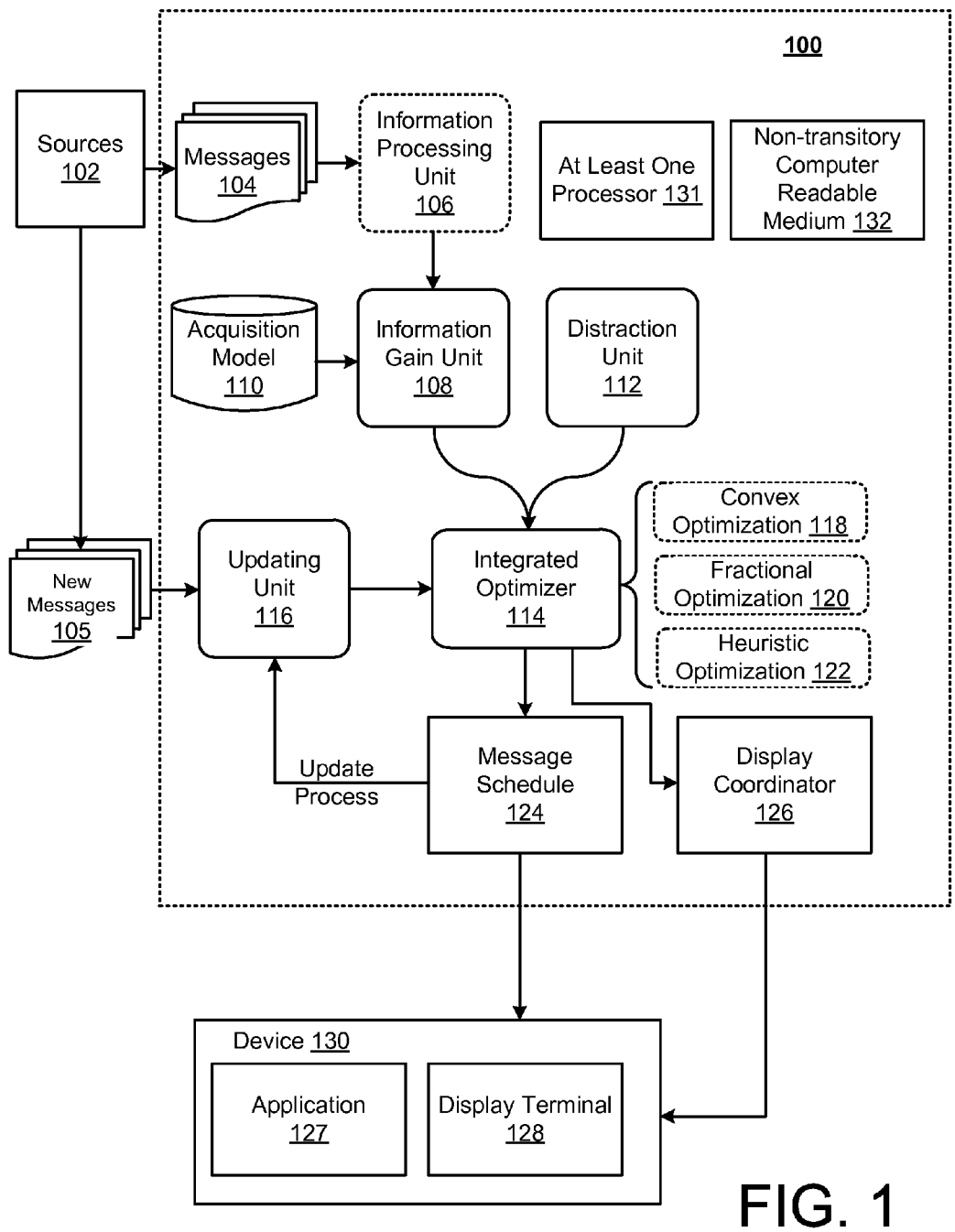
FIG. 1 illustrates a system for maximizing information gain for a plurality of messages according to an embodiment.

The embodiments provide a system for maximizing information gain for messages. For example, the system may receive a plurality of messages from various sources such as email accounts, social media accounts, news sources, weather sources, and/or generally any type of information source that generates messages (also referred to as events or data streams) before presenting these messages on a display terminal for viewing by an end user. The system may process the received messages using an information gain model such that an information gain of the messages may be substantially maximized. For example, the information gain of the messages to be displayed is maximized by determining the appropriate display times and visual characteristics (e.g., size, moving speed, color, etc.) of the messages. Then, the system may output a message schedule for displaying at least a subset of the received messages on a display terminal of a device.

For example, when processing the plurality of received messages, the system may calculate significance and display time of each message in a manner that substantially maximizes the information gain based on the information gain model. The message schedule may indicate which messages are to be displayed (which may depend on their calculated significances), and the display times for the messages to be displayed. Further, depending on the calculated significance, the system may determine one or more visual options (e.g., font, size, color, and moving speeds) of the messages to be displayed, as well as their position on the display terminal. Further, one or more of the visual options may be determined from the attributes of the messages themselves such any type of importance level associated with the user (e.g., the importance level may be set by the provider, the user, or determined by the system), and urgency of the messages.

According to the embodiments, the system may optimize information gain by scheduling the display of messages on the display terminal (which takes into account a size of the display terminal) including determining the messages' sizes, styles, moving speeds, font, colors, and/or any other type of characteristic related to the display of messages. In more detail, the system may optimize the time schedules and relative significances of the messages to maximize the possible information gain, which, as a result, may present relatively important messages in a more efficient manner by considering their temporal, spatial, and visual characteristics.

Generally, the system may solve an optimization problem to determine which messages can be shown on the display terminal, how long they will be shown, and the significances of messages, which may affect the visual options such as font, sizes, colors, display times, moving speeds, and positions, for example. Furthermore, the system may handle continuous events such as a continuous stream of messages from one or more information sources. In one example, the system may evaluate the tradeoff between displaying a new message immediately by canceling a message display before its due time and displaying the new message at a later point. These and other features are further explained below with respect to the figures.

FIG. 1 illustrates a system 100 for maximizing information gain for a plurality of messages 104/105 according to an embodiment. For example, the system 100 may include at least one processor 131, and a non-transitory computer readable medium 132. The non-transitory computer readable medium 132 may include instructions, that when executed by the at least one processor 131, are configured to implement the components and/or functionalities of the system 100, as further described below. The non-transitory computer readable medium 132 may include one or more non-volatile memories, including by way of example semiconductor memory devices, e.g., EPROM, EEPROM, and flash memory devices; magnetic disks, e.g., internal hard disks or removable disks; magneto-optical disks; and CD-ROM and DVD-ROM disks. Besides storing executable instructions, the non-transitory computer-readable medium 132 may also store any type of database structure discussed herein. The at least one processor 131 may include any type of special purpose logic circuitry, e.g., an FPGA (field programmable gate array) or an ASIC (application-specific integrated circuit).

The system 100 may include an information processing unit 106, an acquisition model 110, an information gain unit 108, a distraction unit 112, an integrated optimizer 114, an updating unit 116, and a display coordinator 126. The integrated optimizer 114 may be configured to output a message schedule 124 that schedules at least some of the received (queued) messages 104 within a certain time window based on calculated significances and display times. For example, as further explained below, the integrated optimizer 114 may solve an optimization problem to calculate the significance and the display time for each of the received messages 104 in a manner that maximizes the information gain. Then, depending on the calculated significances and the display times, the integrated optimizer 114 may determine the message schedule 124 for a particular time window that includes at least some of the messages 104. The messages 104 included within the message schedule 124 may be displayed on a display terminal 128 of a device 130.

In one embodiment, the message schedule 124 may include, for each message 104 (and/or new message 105) to be displayed, an identifier that identifies a message 104, the significance of the message 104, and the display time (e.g., start of display and end of display) of the message 104. The integrated optimizer 114 may utilize any type of optimization technique including convex optimization 118, fractional optimization 120, and heuristic optimization 122 for solving for the significance and the display time of the plurality of messages 104 in a manner that maximizes the information gain. It is noted that the initial set of message may be referred to as the messages 104, and the subsequently received new messages 105 may be referred to as the new messages 105. However, throughout the disclosure, any explanation regarding the messages 104 may equally apply to the new messages 105 (or vice versa) unless otherwise noted.

Also, based on the calculated display times and the significances provided by the integrated optimizer 114, the display coordinator 126 may determine a layout of the message schedule 124 including determining one or more visual options including font, color, size, moving speeds, and/or position of the messages 104. Furthermore, the display coordinator 126 may use one or more attributes associated with the messages 104 to determine the layout of the message schedule 124. For example, one of the messages 104 may be associated with an importance level provided by the provider or the user, and the display coordinator 126 may determine the size of this message 104 based on the importance level, where messages 104 with relatively high importance levels may have a relatively large size. Also, the display coordinator 126 may determine one or more of the visual options based on the calculated significance and/or one or more attributes of the messages 104.

Figure 2:
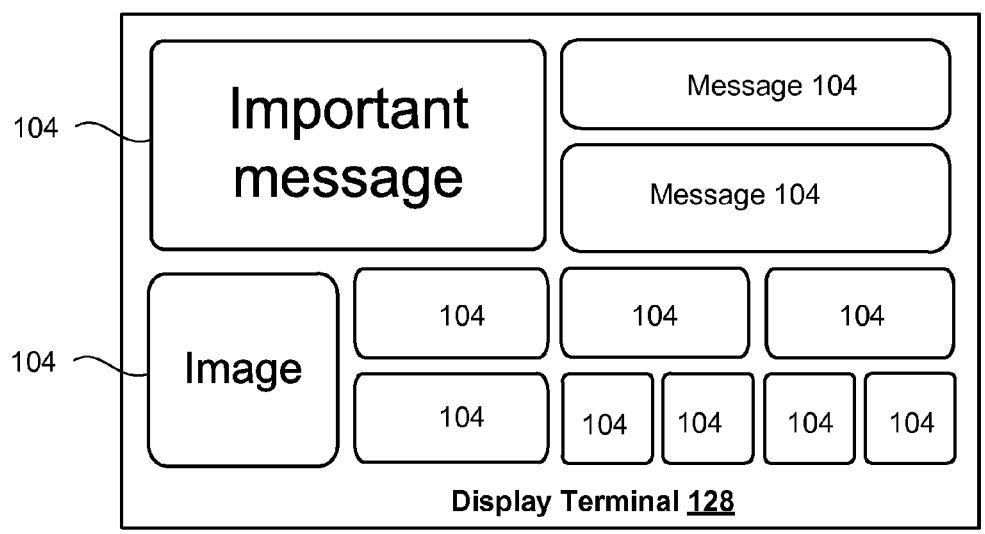
FIG. 2 illustrates an example display of the plurality of messages according to an embodiment.

FIG. 2 illustrates an example display arrangement 200 of the plurality of messages 104 according to an embodiment. For example, FIG. 2 illustrates a layout of the messages 104 generated by the system 100. In particular, depending on each message's calculated significance and display time (as well as the messages' attributes), the display coordinator 126 may determine the layout of the message schedule 124, which is shown in FIG. 2. For instance, a relatively more important message 104 may have a larger size compared to other less important messages 104. For example, if the calculated significance is relatively high, the corresponding message 104 may be considered relatively high. Therefore, according to one example, the size of the messages 104 may be dependent on upon their calculated significance.

Other visual options or display characteristics may be dependent upon the calculated significance and/or the messages' attributes. For example, the calculated significance may affect the color, font style/size, moving, speed, and position of the corresponding message 104. For example, for a message 104 having a relatively high significance, its size may be larger, and the position of the message 104 may be provided in the top right corner. Also, this message 104 may be provided in a different color than the other messages such as red, for example.

Referring back to FIG. 1, in one embodiment, the plurality of messages 104 may be considered an initial set of messages 104, and the integrated optimizer 114 may process the initial set in order to obtain the message schedule 124 for the initial set. As the new messages 105 are received over time, the updating unit 116 may perform an optimization on the new message 105 while considering the information gain of the currently displayed messages (e.g., at least some of the messages 104). For example, the updating unit 116 may be configured to receive the new messages 105 and cause the integrated optimizer to adjust the information gain model to discount the information gain of the display messages (e.g., at least some of the messages 104), and output an updated message schedule based on the adjusted information gain model. The updating unit 116 is further explained later in the disclosure.

The information processing unit 106 may be configured to receive the plurality of messages 104 from at least one source 102 of a plurality of sources 102. The plurality of sources 102 may include any number of information sources that generates messages 104, 105 that are destined to a particular user of the device 130. The plurality of sources 102 may include email accounts (e.g., personal and/or business), social media accounts, new information sources, stock information, weather sources, air pollution reports, calendar, and/or generally any type of information source that is capable of generating messages 104, 105 containing information for viewing by a user.

The device 130 may be any type of device capable of displaying the messages 104, 105 on the display terminal 128. For example, the device 130 may be a laptop, desktop, smartphone, tablet, or generally any type of computing device. The device 130 may include an application 127 and the display terminal 128, as well as any other components that are well known to one of ordinary skill in the art. The application 127 may be an information tool that utilizes the output (e.g., message schedule 124) of the system 100 to provide the display of the messages 104 on the display terminal 128.

According to one embodiment, each of the plurality of messages 104 may include a plurality of attributes such an identifier (ID), content, length, height, importance, timestamp, lifetime of message 104 (e.g., times for which the message is valid), and/or a display indicator indicating whether or not the message must be displayed. Table 1 provided below identifies the plurality of attributes for a particular message 104 as well as their data types and descriptions.

TABLE 1

| Attribute | Data Type | Description |
| --- | --- | --- |
| ID | Integer | Message ID to identify a message |
| Content | String | If content type is not text, store URL |
| Length | Integer | If text, number of characters; otherwise, raw width of frame. |
| Height | Integer | If text, set to 0, otherwise, raw height of frame. |
| Importance | Double | Importance provided by the content provider or user, or determined by system |
| Public Time | Date Time | Timestamp of the message's publication |
| Valid From | Date Time | Valid from this time |
| Valid Until | Date Time | Valid until this time |
| Must Show | Boolean | If this message must be seen by the user |

As shown in Table 1, each message 104 may include a set of attributes such as content, size, public time, valid time etc. According to one example, the information processing unit 106 may receive each message 104 with the type of attributes illustrated in Table 1. For instance, the information processing unit 106 may receive information representing the messages 104 in a format provided by Table 1. For example, the information processing unit 106 may receive a particular message 104 with all the attributes provided by Table 1. According to another example, the information processing unit 106 may receive a particular message 104 with one or more of these attributes, and the information processing unit 106 may determine the other attributes. For example, the information processing unit 106 may receive a message 104 identifying only its ID and content, and the information processing unit 106 may determine other attributes such as the Valid From, Valid Until, Must Show, etc.

The ID attribute may be any type of identifier that is used to identify the message 104, and may be represented by an integer. The content attribute may provide/identify the content of the message 104, which may depend on the type of content. The content types may include images and/or texts. If the content type is text, the content attribute may represent the content as a data string. If the content type is an image, the content attribute may represent the content as a uniform resource locator (URL), or any type of identifier that can identify an image via a network, for example.

The size (or shape) of the message 104 may be represented by the length attribute and the height attribute. Generally, it is noted that the messages 104 may be rectangles, squares, circles, or any kind of size/shape including predefined message shapes where the size is adjustable. The length attribute may specify the length of the message 104, and the height attribute may specify the length of the message 104. If the content type is an image, the length and height attributes may have fixed raw width and height data, and for digital images, the length and height attributes may be represented as pixels. However, it is noted that the size/shape of the message 104 may be represented by any type of value(s) including radius, diameter, or generally any type of measurement that may indicate size/shape of the message 104. Furthermore, a message 104 may include both text data and image data.

Also, the attributes regarding size/shape of the message 104 may be dependent upon the type of display terminal 128 such as whether the display terminal 128 includes a one-dimensional display or a two-dimensional display. If the application 127 is a typical mobile application on a smartphone, the display terminal 128 may provide a list view, which may be considered a one-dimensional display terminal, if, for each message 104, only the fixed length of content will be presented. As such, in this case, the length attribute may specify a certain length, and the length may be the same for all displayed messages 104.

The importance attribute may be defined by the source 102, e.g., news messages can be tagged as breaking/urgent news. Also, the importance attribute may be user preferences, e.g., e-mails from a user's manager may be identified as important. Further, the information processing unit 106 may determine the importance attribute by analyzing the content of the message 104. For example, the information processing unit 106 may perform an analysis method to analyze the content of the message 104 in order to determine its importance level. Generally, the importance or the importance level may represent a relative importance of the corresponding message 104 to the user, the provider, or the system 100.

Also, the information processing unit 106 may adjust one or more of the attributes of a particular message 104. For example, based on the user preferences, the information processing unit 106 may adjust the importance attribute to a different importance level supplied by the user. Further, the information processing unit 106 may adjust any other type of attribute based on the user preference information or information specified by the information processing unit 106.

The public time attribute may represent the timestamp of publication of the message 104. For example, the pubic time attribute may provide the time information (e.g., date, time) regarding when the message 104 was published. The must show attribute may be a display indictor indicating whether the message 104 must be shown. In other words, if the must show attribute is activated, the message 104 must be displayed. If the must show attribute is not activated, the message 104 may or may not be shown.

The lifetime attribute may be represented by the Valid From and Valid To attributes in Table 1. For example, each message 104 may be associated with a lifetime, which enables the flexibility of its appearance on the display terminal 128. In one simplified example, the display terminal 128 may display only two messages at the same time. As such, the lifetime of a message 104 may be different than the display time of the message 104. However, with respect to a particular message 104, its presentation display time period will usually be within its lifetime.

Figure 3:
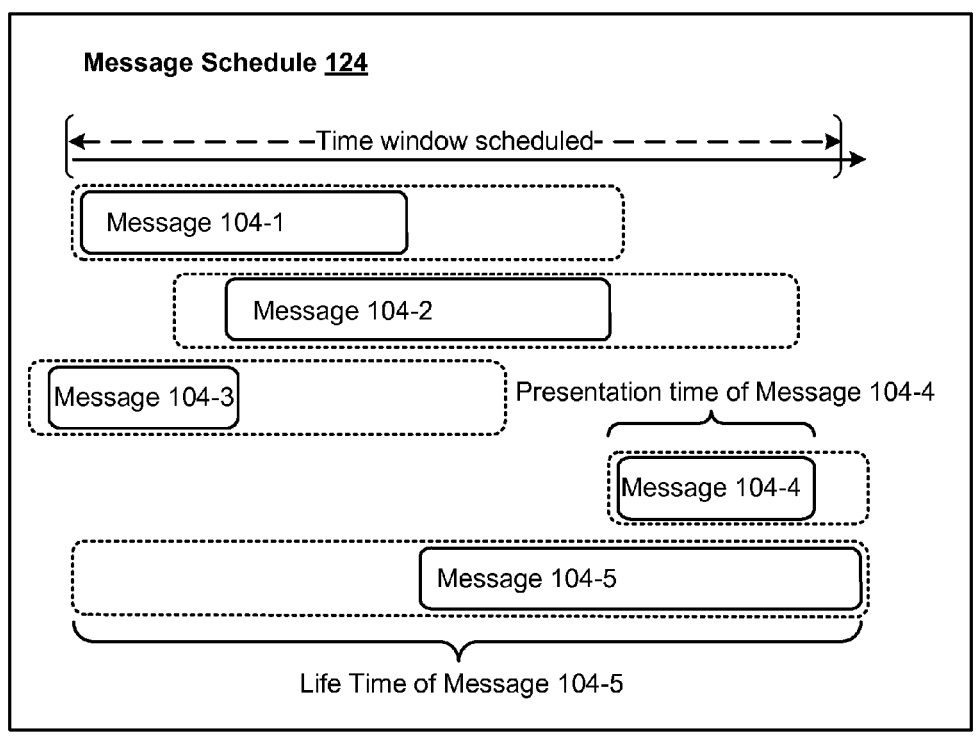
FIG. 3 illustrates a message schedule according to an embodiment.

FIG. 3 illustrates the message schedule 124 according to an embodiment. In one example, the message schedule 124 may identify the messages 104 to be displayed, their significances, and the display times for a time window. The display time may be different than its lifetime value. For example, as shown in FIG. 3, each message 104 may be associated with a lifetime attribute as shown by the dashed-rectangular boxes. However, the display times (as indicated by the solid-rectangular boxes) may be smaller than the start and end times associated with the lifetime attribute. However, a display time must be determined to be within the time period associated with the lifetime attribute. Further, as indicated above, the display time may be constrained to the type of display terminal 128.

In the example of FIG. 3, the display of the messages 104 is limited to displaying two messages 104 at a time. As such, a first message 104-1 and a third message 104-3 may be displayed until a second message 104-2 is displayed. Then, the second message 104-2 is displayed along with the first message 104-1 until a fifth message 104-5 is displayed. Lastly, a fourth message 104-4 is displayed along with the fifth message 104-5 after the second message 104-2 is displayed. As such, the display arrangement of the first message 104-1 to the fifth message 104-5 permits the display of only two messages 104 at a time, where each display time period is within the time period associated with its lifetime attribute.

Referring back to FIG. 1, the integrated optimizer 114 may determine the following outputs while maximizing the information gain, as shown in Table 2.

TABLE 2

| Column Name | Data Type | Description |
| --- | --- | --- |
| ID | Integer | Message ID to identify a message |
| Start Time | Date Time | Start time to show the message |
| End Time | Date Time | End time to show the message |
| Significance | Double | The scale or font size for layout. |

For example, for each message 104 to be included within the message schedule 124 for a particular time window, the integrated optimizer 114 may determine its ID, display times (e.g., Start Time, End Time), and the significance while maximizing the information gain. However, Table 2 is merely an example, where other types of outputs are possible. Also, because the display terminal 128 has a limited size, the system 100 may only display a limited amount of messages 104 at one time.

As further described below, the constraint of a capacity of the display terminal 128 may be relaxed such that the message schedule 124 can be resolved more efficiently. For example, despite of the detailed layout and shapes of messages 104, the exact capacity constraint in terms of the comparison of total original size of messages 104 and the display area's size is relaxed such that the total original size of the messages 104 may be larger than the size of display terminal 128. In that situation, the displayed messages 104 may overlap, which may result in a distraction. However, as further explained below, the distraction unit 112 determines a penalty model to account for the overlapping messages 104, and the penalty model is incorporated into the information gain model.

As indicated above, each message 104 is associated with a lifetime constraint (the lifetime attribute), and a display indicator (Must Show attribute) indicating whether the message 104 must be displayed. If a message 104 has an activated Must Show attribute (e.g., the Must Show attribute is identified as true), then the corresponding lifetime constraint is a hard constraint.

That is, for message m, $T_m^{valid}$ and $T_m^{invalid}$ may represent the start and the end of its lifetime, and $T_m^{start}$ and $T_m^{end}$ represent the start and end of its display time. Then, the relationship between the lifetime and the display time may be represented by:

$$T_m^{valid} < T_m^{start} < T_m^{end} < T_m^{invalid} \quad \text{Eq. (1):}$$

For messages 104 that have soft lifetime constraints, or the display time is not included within it corresponding lifetime, the integrated optimizer 114 may not calculate the information gain for that message 104 in the objective function, as further described below.

The information gain unit 108 may be configured to determine the information gain model. In one example, the information gain unit 108 may be configured to determine the information gain model based on a weighed sum of the information carried by each message 104 of the plurality of messages 104, where the sum of information carried by each message 104 is weighted by the significance of each message 104 of the plurality of messages 104. In order to explain how the information gain unit 108 determines the information gain model, a set of symbols is explained below with reference to Table 3.

TABLE 3

| Terminology | Symbol |
| --- | --- |
| Set of all messages at time t | $M^t$ |
| Set of messages displaying | $M_d$ |
| Set of messages pending | $M_p$ |
| Set of new coming messages | $M_a$ |
| Single message | m |
| Size of a single message m | $S_M$ |
| Capacity of display terminal | C |
| Significance of message m | $\omega_m$ |
| Information carried by single message | $I_m$ |

With respect to the information gain, different messages 104 may carry different information of different importance. According to an embodiment, the amount of information that reaches the user in a period of time may be maximized. Generally, the information that can be acquired from the display terminal 128 by the user includes two parts—first part and a second part. The first part is the information carried by each of the messages 104 on the display terminal 128—$I_n$. The second part is the weighted sum of this information. For example, with respect to the second part, it is not merely the sum of each message's information, but rather a weighted sum, where the weight ($w_m$) is the significance of that message 104 generated by the system 100. The second part may also represent a loss due to the mutual effect between the messages 104, e.g., the distraction. In other words, if too many messages 104 are displayed on the display terminal, the information transfer rate may decrease.

Initially, the information gain unit 108 may determine the information gain by the following equation, which defines the acquirable information in a certain moment.

$$I_t = \sum_{m \in M_d^t} w_m I_m \quad \text{Eq. (2)}$$

For example, the information gain unit 108 may determine the information gain model $I_t$ based on the weighted sum of information carried by each message of the plurality of messages, where the sum of information carried by each message $I_m$ is weighed by the significance $w_m$ of each message.

Then, for over a time window related to a particular message schedule 124, the information gain unit 108 may calculate the total information amount transferred as follows:

$$\text{Maximize } I = \int I_t dt \quad \text{Eq. (3):}$$

Also, it is noted that the integral for time may be pushed down to every message 104 individually. Therefore, the total information gain may be represented by the sum of information gains of all the messages displayed.

From the perspective of psychology, the process for a user to acquire information from a message 104 is not a linear function of time. Conventionally, there are a number of acquisition models (e.g., acquisition model 110) that attempt to model the process of acquisition. Generally, the acquisition models can be described by a time-acquisition curve. As such, the acquisition model may be any type of existing acquisition model to describe a user's behavior.

Without loss of generality, these acquisition models may be denoted by a function A(p, Δt), in which p denotes a set of parameters that correlate to the type of acquisition model, and the Δt indicates the display time. The value of the function is the amount of information acquired by the user. The type of parameters p may be determined by the specific model chosen, and the values may be determined by the specific message (e.g., the intrinsic properties of the message 104).

The information gain unit 108 may be configured to incorporate the acquisition model 110 into the information gain model of Eq. (3), which may result in the following equation:

Maximize $I = \sum_{m \in M} w_m A(p, T_m^1 - T_m^0)$, while
$T_m^{valid} < T_m^{start} < T_m^{end} < T_m^{invalid}$, for messages
104 that have an activated MustShow attribute.  Eq. (4):

For example, the information gain unit 108 may be configured to incorporate any type of acquisition model 110 (e.g., A(p, Δt)) into the information gain model such that the information carried by each message 104 (e.g., $I_m$) is represented by the parameters p specific to the acquisition model 110 and the display time Δt corresponding to a specific message 104. In other words, the attributes and corresponding values (e.g., from Table 1) used in Eq. (4) may depend on the type of acquisition model 110. Regardless of the specific type of acquisition model 110, the information gain unit 108 may use some of the attributes and corresponding values for the parameters p of Eq. (4).

Typically, Eq. (4) is a non-linear function of the significance $w_m$ and the display time $T_m^0$ and $T_m^1$. The integrated optimizer 114 may utilize convex optimization 118, fractional optimization 120, and heuristic algorithm 122 to solve the significance $w_m$ and the display times $T_m^0$ and $T_m^1$ using Eq. (4).

As indicated above, if there are too many messages shown on the screen, some overlaps will happen or the messages' size will shrink, and therefore the user may be distracted and may not be able to fully acquire the information.

The distraction unit 112 may determine a distraction model to determine a penalty value to offset this distraction. For example, the distraction unit 112 may be configured to determine the distraction model to prevent at least an overlap of the messages 104 to be displayed. As shown below, the penalty model may be based on a weight sum of sizes of the plurality of messages 104 in comparison with a capacity of the display terminal 128, where the sum of sizes is weighted by the significance of each message 104 of the plurality of messages 104. To measure the penalty value, the distraction unit 112 determines the following equation as the distraction model.

$$D_t = \begin{cases} 0 & \text{if } \sum_{m \in M_d^t} w_m S_m \leq C \\ \sum_{m \in M_d^t} w_m S_m - C & \text{if } \sum_{m \in M_d^t} w_m S_m > C \end{cases}$$  Eq. (5)

As shown in Eq. (5), the distraction unit 112 may determine the distraction model $D_t$ based on the weighted sum of sizes $S_m$ (where the size is weighted by the significance $W_m$ in comparison to the capacity C of the display terminal 128).

The integrated optimizer 114 may incorporate the distraction model of Eq. (5) into the information gain model, as shown below.

$I_t = \sum_{m \in M_d^t} w_m I_m - \delta D_t,$  Eq. (6):

$I = \sum_{m \in M} w_m A(p, T_m^1 - T_m^0) - \int \delta D_t dt$  Eq. (7):

Then, the integrated optimizer 114 may solve Eq. (7) for the significance $W_m$ and the display times $T_m^0$ and $T_m^1$ using the convex optimization 118, the fractional optimization 120, and/or the heuristic optimization 122. Based on these calculated values, the integrated optimizer 114 may determine and output the message schedule 124 for a particular time window.

When the new messages 105 are received by the information processing unit 106, the updating unit 116 may reschedule the existing messages 104 to make any necessary adjustments such as removing a message 104 on the display terminal 128 or inserting a new message 105 before some older but less important messages 104. Thus, when the updating unit 116 updates the existing message schedule 124, the updating unit 116 may consider those messages 104 already displayed on the display terminal 128. Because the information gains of the currently displayed messages 104 are not as higher as they once were (e.g., due to the passage of times).

The updating unit 116 may adjust the information gain model (e.g., Eq. (7)). For example, in response to the new messages 105, the updating unit 116 may cause the integrated optimizer 114 to discount the information gain of the displayed messages 104. In particular, for those messages in set $M_d^T$, the updating unit 116 may remove the information gain from their appearances to the current time point, as provided by the following equation.

$I = \sum_{m \in M} w_m A(p, T_m^1 - T_m^0) - \int \delta D_t dt - \sum_{m \in M_d^T} w_m A(p, T - T_m^0)$  Eq. (8):

Typically, Eq. (8) is a non-linear function of $w_m$ and $T_m^0$ and $T_m^1$. The updating unit 116 may utilize convex optimization 118, fractional optimization 120, and heuristic optimization 122 to solve the significance $w_m$ and the display times $T_m^0$ and $T_m^1$ using Eq. (8).

Below is the process and Pseudo code to maximize information gain for continuous events:

1: FUNCTION Optimize Information Gain
2: BEGIN
3: // Supposed that all the messages have importance tags
4: Initial Message Set
5: //Define Information Gain Function
6: : $I_o$:=Sum (Information of each message)−Distriction
7: //Solve the problem with nonlinear programming As such, in response to the processing performed by the integrated optimizer 114, the integrated optimizer 114 is configured to output the message schedule 124 for displaying at least a subset of the plurality of messages 104. For example, the integrated optimizer 114 is configured to determine the significance $w_m$ and the display times $T_m^0$ and $T_m^1$ based on the information gain model incorporated with the acquisition model 110 and the distraction model from the distraction unit 112. From the determined significance $w_m$ and the display times $T_m^0$ and $T_m^1$ for each message of the plurality of messages 104, the integrated optimizer 114 may determine the message schedule 124 for a time window.

For instance, the integrated optimizer 114 may determine which message(s) of the plurality of messages 104 to incorporate into the message schedule 124 for the time window to be scheduled based on the determined display times and the significance, which may include a subset of the plurality of messages 104. For example, out of the all the messages that may be displayed, the integrated optimizer 114 may determine which messages 104 are to be displayed in a manner that maximizes the information gain based on the significance. The integrated optimizer 114 considers the messages 104 having the determined display times that fall into the time window, and a display manner that substantially maximizes the information gain.

In one embodiment, for each message 104 to be included within the message schedule 124 for a particular time window, the integrated optimizer 114 may determine its ID, display times (e.g., Start Time, End Time), and significance while maximizing the information gain.

In another embodiment, the display coordinator 126 may be configured to determine the visual options of the displayed messages based on the calculated significance and the display time of each message. The visual options may include font, size, and color of the display messages. For example, the display coordinator 126 may be configured to determine visual characteristics of the messages 104 to be displayed such as their size, font, color, moving speeds, etc. In one example, if a particular message 104 has a relatively high calculated significance, the display coordinator 126 may determine it size to be larger than other messages having a lower calculated significance. However, the embodiments encompass any type of technique/formula that determines one or more visual options based on its calculated significance.

In another embodiment, the display coordinator 126 may determine a position on the display terminal 128 for each displayed messages based on the corresponding calculated significance. For example, for messages having relatively high calculated significances, the display coordinator 126 may place these types of messages 104 in a location more visible to the end user such as the top right.

In a further embodiment, the display coordinator 126 may determine a speed in which the displayed messages are moving on the display terminal 128 based on the calculated significance. For example, in this example, the displayed messages may move on the display terminal 128, and the speed of the display messages may depend on the calculated significance.

Figure 4:
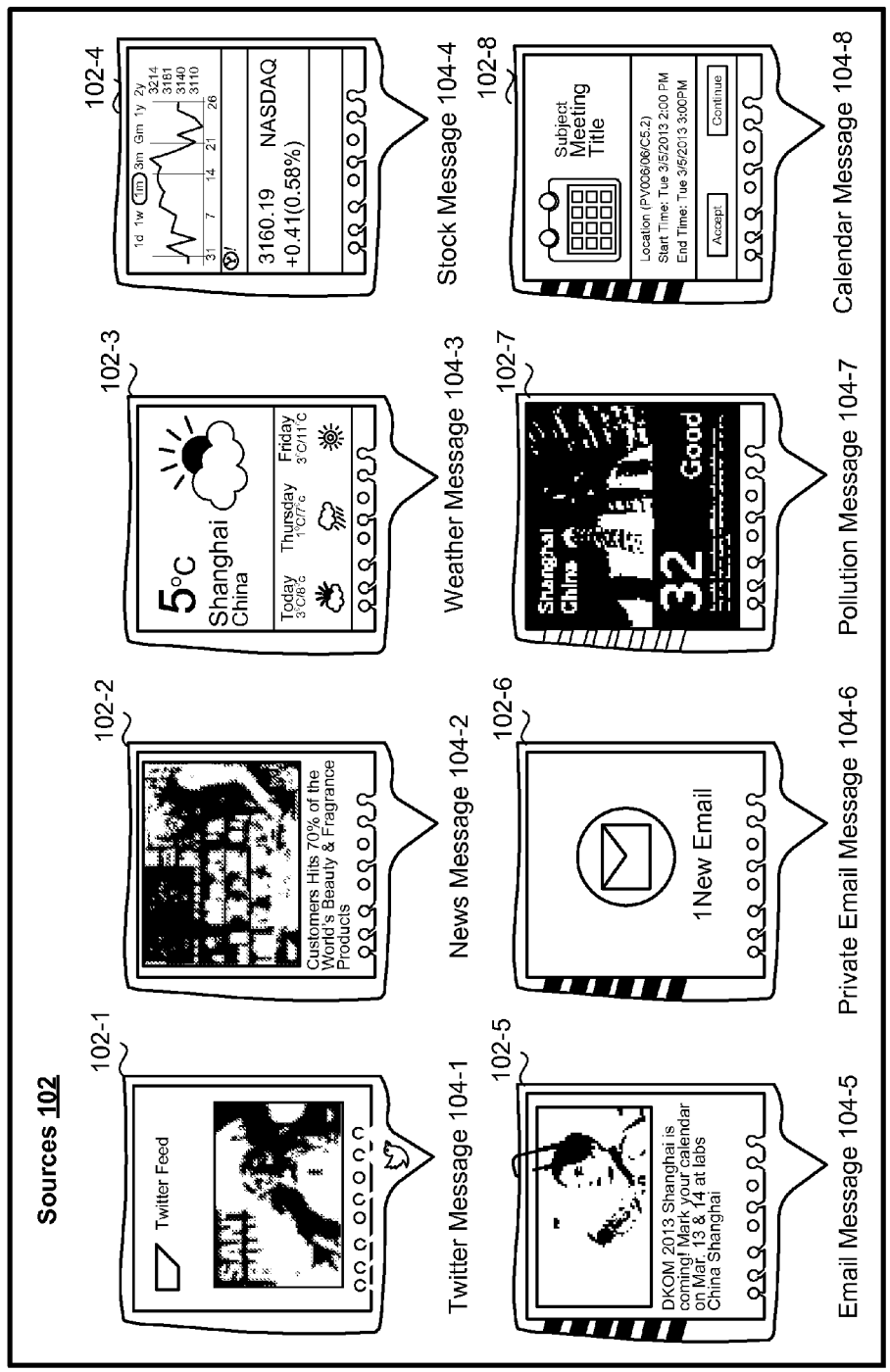
FIG. 4 illustrates a plurality of sources generating a plurality of messages according to an embodiment.

FIG. 4 illustrates a plurality of sources 102 generating a plurality of messages 104 according to an embodiment. For example, the plurality of sources 102 may include a Twitter account 102-1 generating a Twitter message 104-1, a news source 102-2 generating a news message 104-2, a weather source 102-3 generating a weather message 104-3, a stock source 102-4 generating a stock message 104-4, an email account 102-5 generating an email message 104-5, a private email account 102-6 generating a private email message 104-6, a pollution report source 102-7 generating a pollution report 104-7, and a calendar source 102-8 generating a calendar message 104-8.

Figure 5:
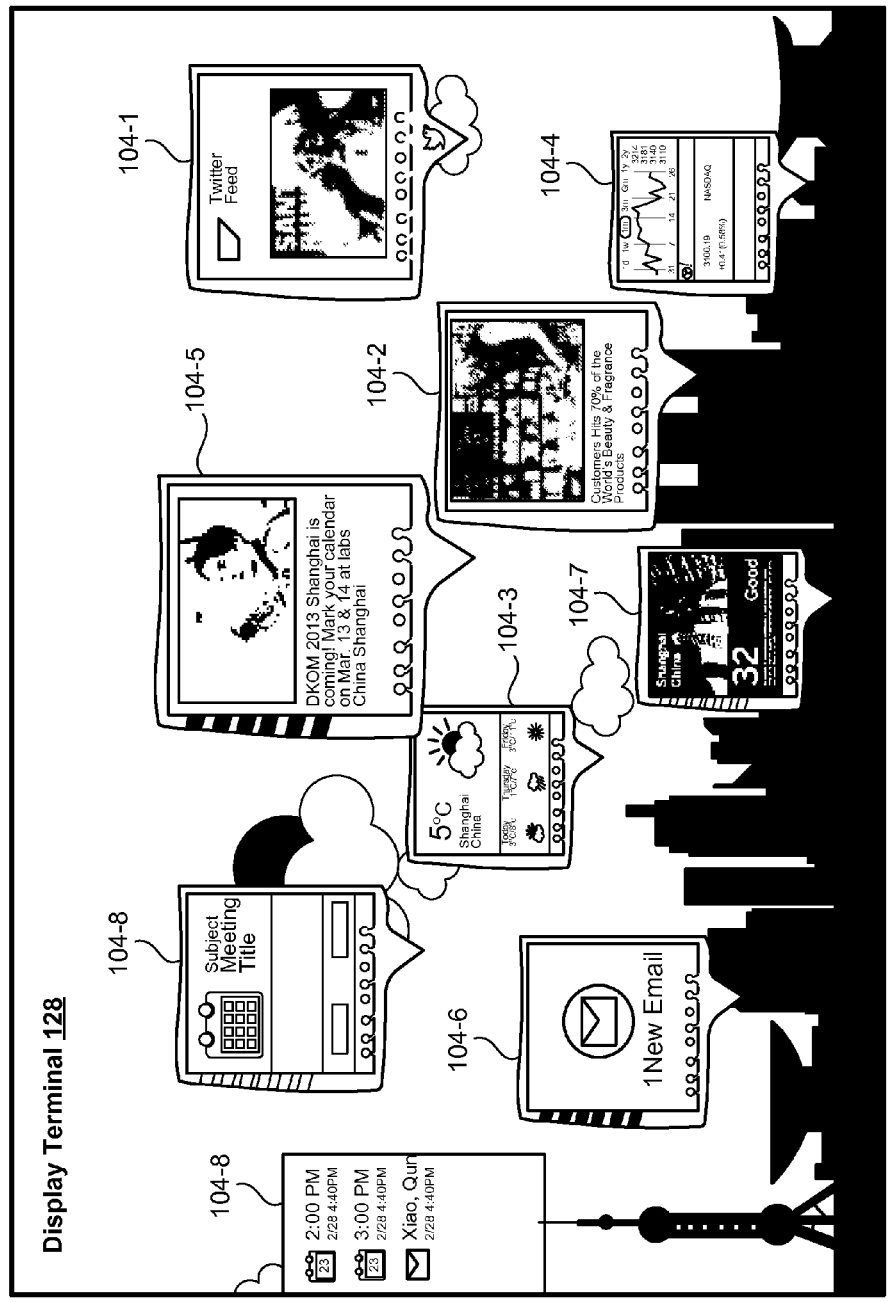
FIG. 5 illustrates a display arrangement of the messages of FIG. 4 on a display terminal according to an embodiment.

FIG. 5 illustrates a display arrangement of the messages 104 of FIG. 4 on the display terminal 128 according to an embodiment. For example, the system 100 may receive the plurality of messages 104, process the plurality of messages 104 to determine the message schedule 124, and display the plurality of messages 104 as shown in FIG. 5. The plurality of message 104 is displayed in a manner that optimizes their spatial, temporal, and visual characteristics to maximize the information gain.

According to one embodiment, the messages 104 may be moving with different speeds on the display terminal 128 and shown in different sizes. For example, at least some of the messages 104 may be moving with different speeds, and have different display sizes. For example, the speed of the message 104 moving on the display terminal 128 may indicate its time urgency and the size is used to indicate it importance or relevant to a specified keyword. As shown in FIG. 5, according to the determined messages schedule 124, the twitter message 104-1, the news message 104-2, the weather message 104-3, the stock message 104-4, the email message 104-5, the private email message 104-6, the pollution message 104-7 and two calendar messages 104-8 may be displayed.

The display coordinator 126 may determine the visual characteristics of the messages 104. In this example, the display coordinator 126 may determine the message's size and moving speed based on its corresponding importance, and urgency, respectively. The importance may be determined from the importance attribute of the message 104, and the importance attribute may be set by the provider, the user, or determined by the system 100. The message's urgency may be determined from the time value associated with the message 104 (e.g., such as the messages publication time, meeting time in case of a calendar message, etc.) in comparison with the current time.

Referring to FIG. 5, the importance may determine the message's size, e.g., the email message 104-5 (from work) has been identified as important, and therefore displayed in a size larger than some of the other messages 104. Further, the moving speed of the message 104 may be determined from the urgency, e.g., the calendar message 104-8 (e.g., with Subject Meeting Title) may be associated with a meeting time relatively close to the current time, and therefore this calendar message 104-8 may be moving with a speed higher than some of the other messages 104.

Figure 6:
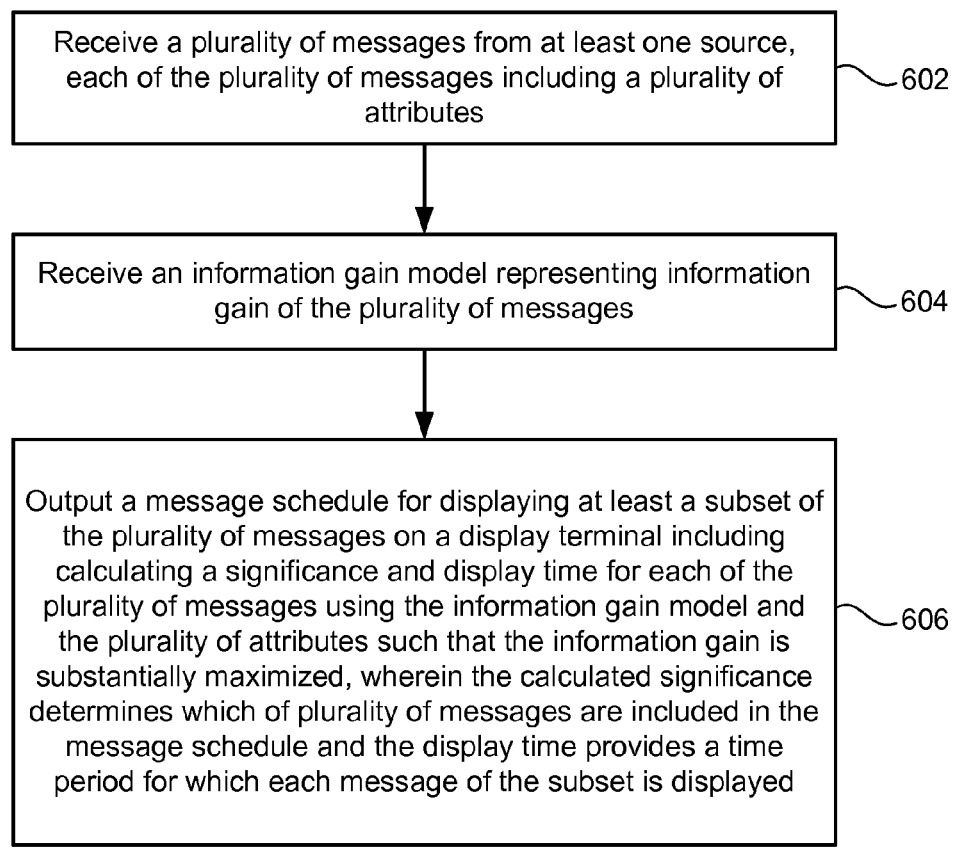
FIG. 6 is a flowchart illustrating example operations of the system of FIG. 1 according to an embodiment.

FIG. 6 is a flowchart illustrating example operations of the system 100 of FIG. 1 according to an embodiment. Although FIG. 6 is illustrated as a sequential, ordered listing of operations, it will be appreciated that some or all of the operations may occur in a different order, or in parallel, or iteratively, or may overlap in time.

A plurality of messages may be received from at least one source, where each of the plurality of messages may include a plurality of attributes (602). For example, the information processing unit 106 may be configured to receive a plurality of messages 104 from at least one source 102. Each of the messages may include one or more of the attributes provided in Table 1.

An information gain model representing information gain of the plurality of messages may be received (604). For example, the integrated optimizer 114 may receive the information gain model representing information gain of the plurality of messages. The integrated optimizer 114 may receive the information gain model (e.g., incorporated with the acquisition model 110) from the information gain unit 108. Also, the integrated optimizer 114 may receive the distraction model from the distraction unit 112, and incorporate the distraction model into the information gain model.

A message schedule may be outputted for displaying at least a subset of the plurality of messages on a display terminal including calculating a significance and display time for each of the plurality of messages using the information gain model and the plurality of attributes such that the information gain is substantially maximized, where the calculated significance determines which of the plurality of messages are included in the message schedule and the display time provides a time period for which each message of the subset is displayed (606).

For example, the integrated optimizer 114 may be configured to output the message schedule 124 for displaying at least a subset of the plurality of messages 104 on the display terminal 128 including calculating the significance and the display time for each of the plurality of messages 104 using the information gain model and the plurality of attributes such that the information gain is substantially maximized, where the calculated significance determines which of the plurality of messages 104 are included in the message schedule 124 and the display time provides the time period for which each message 104 of the subset is displayed.

For example, in response to the processing performed by the integrated optimizer 114, the integrated optimizer 114 is configured to output the message schedule 124 for displaying at least a subset of the plurality of messages 104. For example, the integrated optimizer 114 is configured to determine the significance $w_m$ and the display times $T_m^0$ and $T_m^1$ based on the information gain model incorporated with the acquisition model 110 and the distraction model from the distraction unit 112. From the determined significance $w_m$ and the display times $T_m^0$ and $T_m^1$ for each message of the plurality of messages 104, the integrated optimizer 114 may determine the message schedule 124 for a time window.

The integrated optimizer 114 may determine which message(s) of the plurality of messages 104 to incorporate into the message schedule 124 for the time window to be scheduled based on the determined display times and the significance, which may include a subset of the plurality of messages 104. For example, out of the all the messages that may be displayed, the integrated optimizer 114 may determine which messages 104 are to be displayed in a manner that maximizes the information gain based on the significance. The integrated optimizer 114 considers the messages 104 having the determined display times that fall into the time window, and a display manner that substantially maximizes the information gain.

In one embodiment, for each message 104 to be included within the message schedule 124 for a particular time window, the integrated optimizer 114 may determine its ID, display times (e.g., Start Time, End Time), and significance while maximizing the information gain. In another embodiment, the display coordinator 126 may be configured to determine the visual options of the displayed messages based on the calculated significance and the display time of each message. The visual options may include font, size, and color of the display messages. For example, the display coordinator 126 may be configured to determine visual characteristics of the messages 104 to be displayed such as their size, font, color, moving speeds, etc. In one example, if a particular message 104 has a relatively high calculated significance, the display coordinator 126 may determine it size to be larger than other messages having a lower calculated significance. However, the embodiments encompass any type of technique/formula that determines one or more visual options based on its calculated significance.

In another embodiment, the display coordinator 126 may determine a position on the display terminal 128 for each displayed messages based on the corresponding calculated significance. For example, for messages having relatively high calculated significances, the display coordinator 126 may place these types of messages 104 in a location more visible to the end user such as the top right. In a further embodiment, the display coordinator 126 may determine a speed in which the displayed messages are moving on the display terminal 128 based on the calculated significance. For example, in this example, the displayed messages may move on the display terminal 128, and the speed of the display messages may depend on the calculated significance.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for maximizing information gain for messages, the system comprising:
    at least one processor;
    a non-transitory computer-readable medium including instructions executable by the at least one processor, the instructions configured to implement,
    an information processing unit configured to receive a plurality of messages from at least one source, each of the plurality of messages including a plurality of attributes; and
    an integrated optimizer configured to receive an information gain model representing information gain of the plurality of messages, and output a message schedule for displaying at least a subset of the plurality of messages on a display terminal including calculating a significance and display time for each of the plurality of messages using the information gain model and the plurality of attributes such that the information gain is maximized,
    wherein the calculated significance determines which of the plurality of messages are included in the message schedule and the display time provides a time period for which each message of the subset is displayed.

2. The system of claim 1, further comprising:
    an information gain unit configured to determine the information gain model based on a weighted sum of information carried by each message of the plurality of messages, wherein the sum of information carried by each message is weighted by the significance of each message of the plurality of messages.

3. The system of claim 2, wherein the information gain unit configured to determine the information gain model also includes incorporating an acquisition model into the information gain model such that the information carried by each message is represented by parameters specific to the acquisition model and the display time corresponding to a respective message.

4. The system of claim 1, further comprising:
    a distraction unit configured to determine a penalty model to prevent at least an overlap of displayed messages, the penalty model being based on a weighted sum of sizes of the plurality of messages in comparison with a capacity of the display terminal, wherein the sum of sizes is weighted by the significance of each message of the plurality of messages,
    wherein the integrated optimizer is configured to incorporate the penalty model into the information gain model.

5. The system of claim 1, further comprising:
    a display coordinator configured to determine visual options of the displayed messages based on the calculated significance and the display time of each message, the visual options including at least one of font, size, and color of the displayed messages.

6. The system of claim 5, wherein the display coordinator is configured to determine a position on the display terminal for each displayed messages based on the corresponding calculated significance.

7. The system of claim 5, wherein the display coordinator is configured to determine a speed in which the displayed messages are moving based on the corresponding calculated significance.

8. The system of claim 1, wherein at least one of the plurality of attributes includes an importance attribute indicating a relative level of importance to a respective source or user.

9. The system of claim 1, further comprising:
    an updating unit configured to receive new messages and cause the integrated optimizer to adjust the information gain model to discount the information gain of the displayed messages,
    wherein the integrated optimizer is configured to output an updated schedule for the new messages and the displayed messages based on the adjusted information gain model.

10. A non-transitory computer-readable medium storing instructions that when executed cause at least one processor to maximize information gain of messages, the instructions comprising instructions to:
    receive a plurality of messages from at least one source, each of the plurality of messages including a plurality of attributes;
    receive an information gain model representing information gain of the plurality of messages; and
    output a message schedule for displaying at least a subset of the plurality of messages on a display terminal including calculating a significance and display time for each of the plurality of messages using the information gain model and the plurality of attributes such that the information gain is maximized,
    wherein the calculated significance determines which of the plurality of messages are included in the message schedule and the display time provides a time period for which each message of the subset is displayed.

11. The non-transitory computer-readable medium of claim 10, wherein the instructions include instructions to:
    determine the information gain model based on a weighted sum of information carried by each message of the plurality of messages, wherein the sum of information carried by each message is weighted by the significance of each message of the plurality of messages.

12. The non-transitory computer-readable medium of claim 11, wherein the instructions to determine the information gain model include instructions to incorporate an acquisition model into the information gain model such that the information carried by each message is represented by parameters specific to the acquisition model and the display time corresponding to a respective message.

13. The non-transitory computer-readable medium of claim 10, wherein the instructions include instructions to:
    determine a penalty model to prevent at least an overlap of displayed messages, the penalty model being based on a weighted sum of sizes of the plurality of messages in comparison with a capacity of the display terminal, wherein the sum of sizes is weighted by the significance of each message of the plurality of messages; and
    incorporate the penalty model into the information gain model.

14. The non-transitory computer-readable medium of claim 10, wherein the instructions include instructions to:
    determine visual options of the displayed messages based on the calculated significance and the display time of each message, the visual options including at least one of font, size, and color of the displayed messages.

15. The non-transitory computer-readable medium of claim 14, wherein the instructions to determine visual options include instructions to determine a position on the display terminal for each displayed messages based on the corresponding calculated significance.

16. The non-transitory computer-readable medium of claim 10, wherein the instructions include instructions to:
receive new messages and adjust the information gain model to discount the information gain of the previously displayed messages; and
output an updated schedule based on the adjusted information gain model.

17. A method for maximizing information gain of messages, the method comprising:
receiving, by at least one processor, a plurality of messages from at least one source, each of the plurality of messages including a plurality of attributes;
determining, by the at least one processor, an information gain model representing information gain of the plurality of messages, the information gain model being based on a weighted sum of information carried by each message of the plurality of messages, wherein the sum of information carried by each message is weighted by a significance of each message of the plurality of messages;
incorporating, by the at least one processor, an acquisition model into the information gain model such that the information carried by each message is represented by parameters specific to the acquisition model and a display time corresponding to a respective message; and
outputting, by the at least one processor, a message schedule for displaying the plurality of messages including calculating the significance and the display time for each of the plurality of messages such that the information gain is maximized based on the information gain model and the plurality of attributes of the plurality of messages.

18. The method of claim 17, further comprising:
determining, by the at least one processor, a penalty model to prevent at least an overlap of displayed messages, the penalty model being based on a weighted sum of sizes of the plurality of messages in comparison with a capacity of the display terminal, wherein the sum of sizes is weighted by the significance of each message of the plurality of messages; and
incorporating, by the at least one processor, the penalty model into the information gain model.

19. The method of claim 17, further comprising:
determining, by the at least one processor, visual options of the displayed messages based on the calculated significance and the display time of each message, the visual options including at least one of font, size, and color of the displayed messages.

20. The method of claim 17, further comprising:
receiving, by the at least one processor, new messages;
adjusting, by the at least one processor, the information gain model to discount the information gain of the displayed messages; and
outputting, by the at least one processor, an updated schedule for the new messages and the display messages based on the adjusted information gain model.

* * * * *